(12) United States Patent
Moro

(10) Patent No.: US 10,063,741 B1
(45) Date of Patent: Aug. 28, 2018

(54) IMAGE PROCESSING APPARATUS AND IMAGE PROCESSING METHOD

(71) Applicants: KABUSHIKI KAISHA TOSHIBA, Tokyo (JP); TOSHIBA TEC KABUSHIKI KAISHA, Tokyo (JP)

(72) Inventor: Akihiro Moro, Shizuoka (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/669,464

(22) Filed: Aug. 4, 2017

(30) Foreign Application Priority Data

Feb. 24, 2017 (JP) ................. 2017-034135

(51) Int. Cl.
| | |
|---|---|
| *G06F 3/12* | (2006.01) |
| *H04N 1/401* | (2006.01) |
| *H04N 1/387* | (2006.01) |
| *H04N 1/00* | (2006.01) |
| *H04N 1/203* | (2006.01) |

(52) U.S. Cl.
CPC ......... *H04N 1/401* (2013.01); *H04N 1/00737* (2013.01); *H04N 1/00748* (2013.01); *H04N 1/00806* (2013.01); *H04N 1/2034* (2013.01); *H04N 1/3878* (2013.01); *H04N 2201/0094* (2013.01)

(58) Field of Classification Search
CPC .............. H04N 1/401; H04N 1/00737; H04N 1/00748; H04N 1/00806; H04N 1/2034; H04N 1/3878; H04N 2201/0094
USPC ..................................................... 358/1.13
See application file for complete search history.

(56) References Cited

U.S. PATENT DOCUMENTS

| | | | |
|---|---|---|---|
| 8,009,335 B2 | 8/2011 | Honda | |
| 2009/0009825 A1* | 1/2009 | Honda | H04N 1/3878 358/488 |
| 2013/0148171 A1* | 6/2013 | Shinya | H04N 1/2032 358/448 |
| 2015/0381854 A1* | 12/2015 | Horiguchi | H04N 1/4076 358/406 |
| 2017/0331983 A1* | 11/2017 | Ishido | H04N 1/0464 |

* cited by examiner

*Primary Examiner* — Neil R McLean
(74) *Attorney, Agent, or Firm* — Foley & Lardner LLP

(57) ABSTRACT

In accordance with an embodiment, an image processing apparatus comprises a front surface reading section, a back surface reading section, a back surface image processing section and a front surface image processing section. The front surface reading section reads a range containing a front surface of a sheet. The back surface reading section reads a range containing a back surface of the sheet. The back surface image processing section detects a position of a sheet part in back surface image data based on the back surface image data obtained by reading the sheet back surface. The front surface image processing section extracts an image on the sheet part from front surface image data obtained by reading the sheet front surface based on the position of the sheet part in the back surface image data.

10 Claims, 9 Drawing Sheets

FIG.10

DELIVERY NOTE  [20xx] YEAR  [xx] MONTH  [xx] DAY

[ADDRESSEE]
YAMAMOTO TAROU

[ADDRESS]
SHIZUOKA PREFECTURE MISHIMA-SHI○○

[CLIENT]
YAMAMOTO TAROU

[DELIVERY DETAILS]

| No. | MODEL NUMBER | COMMODITY NAME | MANUFACTURER'S NAME | NUMBER |
|---|---|---|---|---|
| 1 | 123456 | ABC-COMPONENT A | ABC COMPANY | 7 |

THAT'S ALL
○○COMMERCIAL CORPORATION

IMAGE PROCESSING APPARATUS AND IMAGE PROCESSING METHOD

CROSS-REFERENCE TO RELATED APPLICATION

This application is based upon and claims the benefit of priority from Japanese Patent Application No. 2017-034135, filed Feb. 24, 2017, the entire contents of which are incorporated herein by reference.

FIELD

Embodiments described herein relate generally to an image processing apparatus and an image processing method.

BACKGROUND

There is an image processing apparatus capable of reading an irregular sheet such as a voucher or a receipt as an original document which is a reading object. In the reading of such an irregular sheet, first, a range including the whole sheet is read. A sheet part and a part of material (for example, a sheet cover coated on a sheet table) of a sheet back surface are contained in a read image. The irregular sheet is generally read by extracting an image of the sheet part from an image read in this manner.

However, if a color of a material of the sheet back surface is similar to a color of a ground of the sheet, there is a case in which it is difficult to identify a contour line on the sheet part and it is impossible to correctly extract the image of the sheet part. The sheet cover is generally constituted by white material which is hard to cover an image at the time of copying, and the background of the sheet which is the reading object is mostly white. Thus, in the image data acquired by reading, there is a case where it is difficult to distinguish the white part of the sheet cover and the white part of the sheet ground. Conventionally, although there are some proposals of an image processing apparatus including a component for solving such a problem, in each of those proposals, a member having a color distinguishable from the sheet part is arranged on the sheet back surface. In such a construction, a special mechanism which controls addition of the member and a position of the member is necessary, which may lead to an increase in manufacturing cost.

DESCRIPTION OF THE DRAWINGS

FIG. 10 is a diagram illustrating a concrete example of image data outputted as a reading result.

DETAILED DESCRIPTION

In accordance with an embodiment, an image processing apparatus comprises a front surface reading section, a back surface reading section, a back surface image processing section and a front surface image processing section. The front surface reading section reads a range containing a front surface of a sheet. The back surface reading section reads a range containing a back surface of the sheet. The back surface image processing section detects a position of a sheet part in back surface image data based on the back surface image data obtained by reading the sheet back surface. The front surface image processing section extracts an image on the sheet part from front surface image data obtained by reading the sheet front surface based on the position of the sheet part in the back surface image data.

Hereinafter, an image processing apparatus and an image processing method of an embodiment are described with reference to the accompanying drawings.

Figure 1:
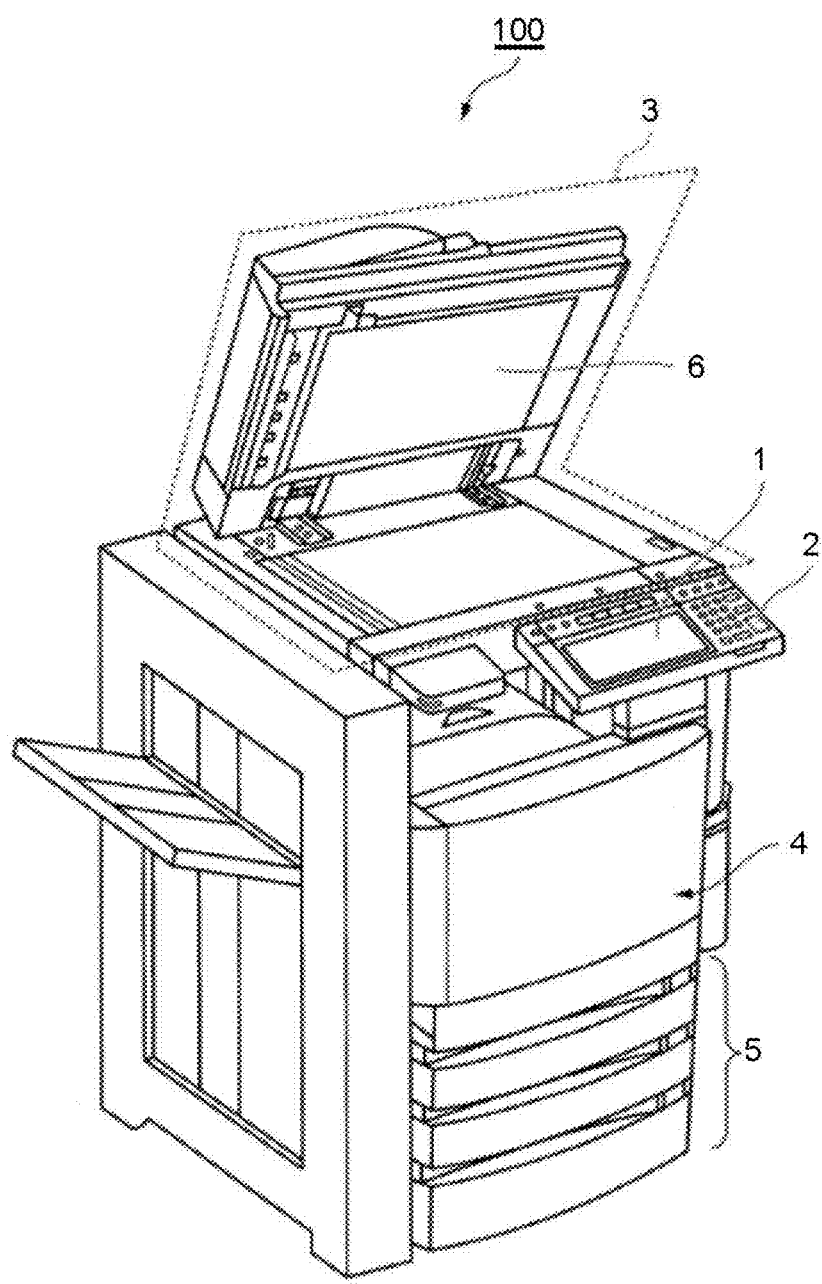
FIG. 1 is an external view exemplifying the whole construction of an image processing apparatus 100 according to an embodiment.

FIG. 1 is an external view exemplifying the entire structure of an image processing apparatus 100 according to the present embodiment. The image processing apparatus 100 may be, for example, a multi-function peripheral. The image processing apparatus 100 may comprise a display 1, a control panel 2, an image reading section 3, a printer section 4 and a sheet housing section 5. The image processing apparatus 100 may form an image on a sheet using a developing agent such as a toner. The sheet may be, for example, a paper or a label paper. The sheet may be an optional object as long as the image processing apparatus 100 can form an image on a surface thereof.

The display 1 is an image display device such as a liquid crystal display, an organic EL (Electro Luminescence) display, or the like. The display 1 displays various information relating to the image processing apparatus 100.

The control panel 2 has a plurality of buttons. The control panel 2 receives an operation by a user. The control panel 2 outputs a signal in response to the operation executed by the user to a controller of the image processing apparatus 100. The display 1 and the control panel 2 may be integrated as a touch panel.

The image reading section 3 reads image information of a sheet which is a reading object as an intensity of light. The image reading section 3 can read front and back surfaces of the sheet almost simultaneously at the time of duplex scanning. The image reading section 3 records the read image information. The recorded image information may be transmitted to another information processing apparatus via a network. The recorded image information may be used to form an image on the sheet by the printer section 4. The image reading section 3 includes a white cover 6 for pressing the sheet.

The printer section 4 forms an image on the sheet based on image information generated by the image reading section 3 or image information received via a communication path. The printer section 4 forms an image by the following processing, for example. An image forming section of the printer section 4 forms an electrostatic latent image on a photoconductive drum based on the image information. The image forming section of the printer section 4 forms a visible image by attaching a developing agent to the electrostatic latent image. The toner is exemplified as a concrete example of the developing agent. A transfer section of the printer section 4 transfers the visible image onto the sheet. A fixing section of the printer section 4 fixes the visible image on the sheet by heating and pressurizing the sheet. The sheet on which an image is formed may be a sheet housed in the sheet housing section 5 or may be a manually fed sheet.

The sheet housing section 5 houses sheets used for image formation by the printer section 4.

Figure 2:
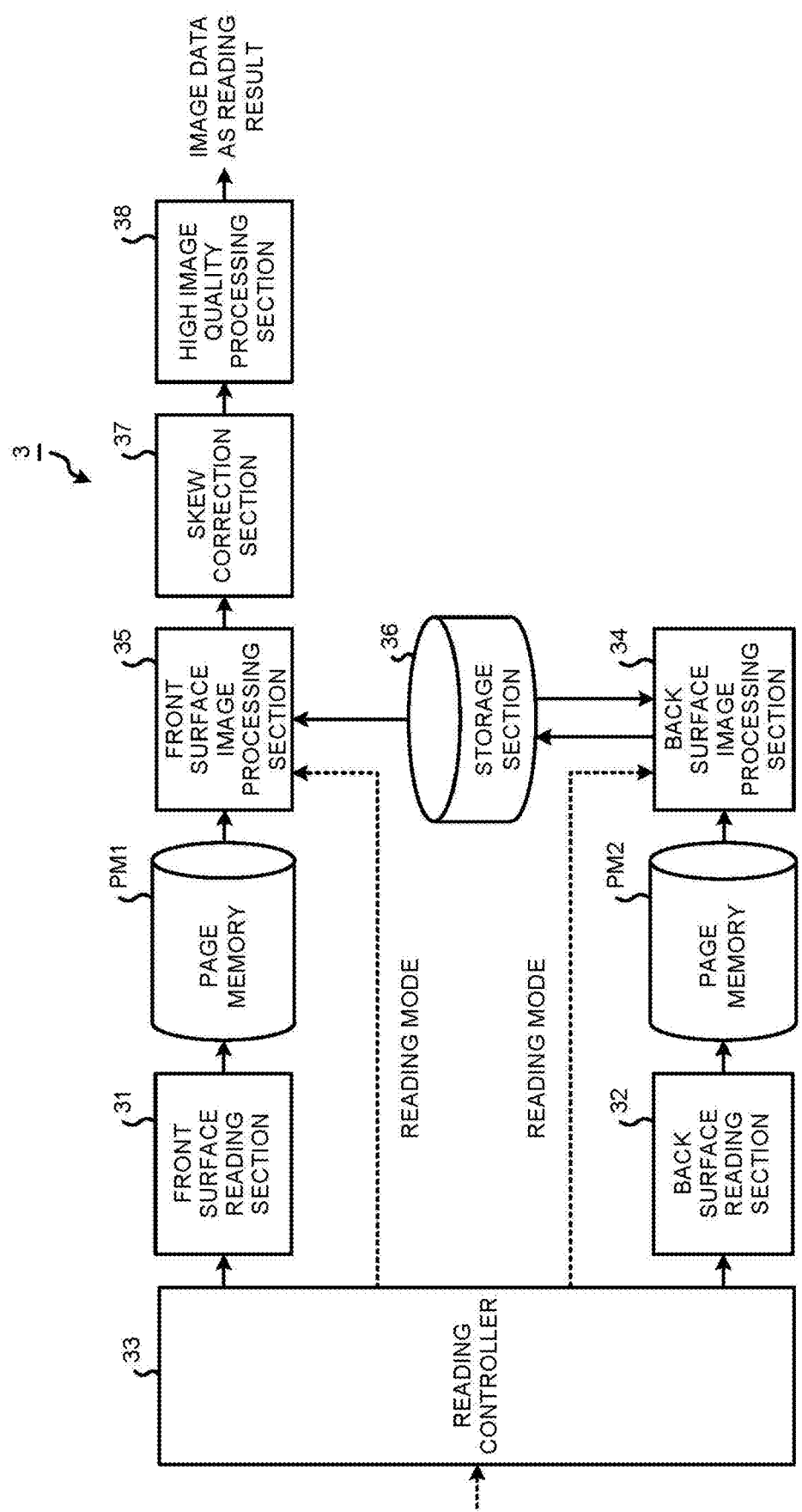
FIG. 2 is a diagram illustrating a concrete example of functional components of an image reading section 3 according to the present embodiment.

FIG. 2 is a diagram illustrating a concrete example of functional components of the image reading section 3 according to the present embodiment. The image reading section 3 may be provided with a front surface reading section 31, a back surface reading section 32, a reading controller 33, a back surface image processing section 34, a front surface image processing section 35, a storage section 36, a skew correction section 37 and a high image quality processing section 38. The front surface reading section 31 reads a front surface of a sheet to generate image data (hereinafter, referred to as "front surface image data") obtained by reading the front surface of the sheet. The front surface reading section 31 outputs the generated front surface image data to the front surface image processing section 35.

The back surface reading section 32 reads a back surface of the sheet to generate image data (hereinafter, referred to as "back surface image data") obtained by reading the back surface of the sheet. The back surface reading section 32 outputs the generated back surface image data to the back surface image processing section 34. The front surface reading section 31 and the back surface reading section 32 may read the front surface and the back surface of the sheet at different positions on a conveyance path or at the same position on the conveyance path.

The reading controller 33 has a function of controlling an operation of the image reading section 3 according to a reading mode. The reading mode is an image reading operation mode designated for the image processing apparatus 100. For example, the reading mode may include a regular mode for reading a regular sheet and an irregular mode for reading an irregular sheet. The reading mode for the image processing apparatus 100 is designated by a user. For example, the user designates the reading mode for the image processing apparatus 100 by operating the control panel 2. The control panel 2 informs the image reading section 3 of the inputted reading mode.

Specifically, if the reading mode is the irregular mode, the reading controller 33 enables the front surface reading section 31 and the back surface reading section 32 to read both sides of the sheet, and enables the back surface image processing section 34 and the front surface image processing section 35 to execute image processing in response to the irregular mode.

The back surface image processing section 34 executes an image processing in response to the reading mode informed from the reading controller 33 on the back surface image data generated by the back surface reading section 32. Specifically, the back surface image processing section 34 carries out an image processing for specifying the sheet position in the image on the back surface image data. The back surface image processing section 34 specifies the sheet position in the image based on the back surface image data on which the image processing is executed and stores information indicating the specified sheet position (hereinafter, referred to as a "back surface position information") in the storage section 36.

The front surface image processing section 35 executes an image processing in response to the reading mode informed from the reading controller 33 on the front surface image data generated by the front surface reading section 31. Specifically, the back surface image processing section 34 extracts the image on the sheet front surface from the front surface image data based on the back surface position information generated by the front surface image processing section 35. The front surface image processing section 35 outputs the extracted image data of the sheet front surface to the skew correction section 37.

The storage section 36 is constituted by a storage device such as a magnetic hard disk device or a semiconductor storage device. The storage section 36 stores setting information. The setting information indicates settings necessary for the image processing in the back surface image processing section 34 and the front surface image processing section 35. Specifically, the setting information includes information necessary for a gradation conversion processing of the image data. For example, the information necessary for the gradation conversion processing of the image data is stored in a form of a lookup table (LUT) that gives a value of output data with respect to a value of input data. Hereinafter, the LUT used as the setting information of the gradation conversion processing is described as LUT for gradation conversion. In the LUT for gradation conversion, different LUTs may be provided depending on property and purpose of the gradation conversion processing.

The skew correction section 37 executes a skew correction processing for correcting deviation of the inclination of the image with respect to the image data obtained by extracting the image data outputted from the front surface image processing section 35. The skew correction section 37 outputs the image data subjected to the skew correction processing to the high image quality processing section 38.

The high image quality processing section 38 executes a high image quality processing for removing noise, enhancing edges and the like. The high image quality processing section 38 outputs the image data subjected to the high image quality processing as the reading result of the irregular mode.

Figures 3, 4:
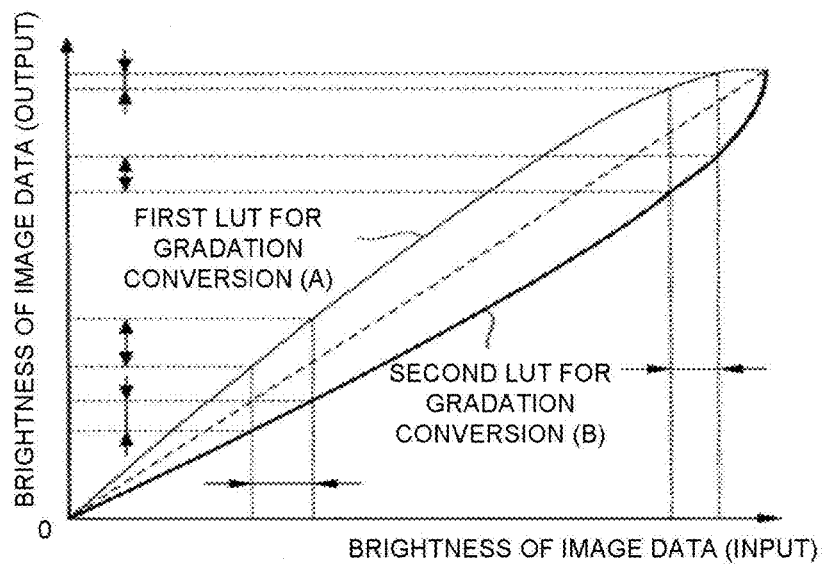
FIG. 3 is a diagram illustrating a concrete example of a LUT for gradation conversion according to the present embodiment.
FIG. 4 is a diagram illustrating a concrete example of image data obtained by eliminating a highlight side by a gradation conversion processing.

FIG. 3 is a diagram illustrating a concrete example of the LUT for gradation conversion according to the present embodiment. FIG. 3 shows two LUTs for gradation conversion including a first LUT for gradation conversion (A) and a second LUT for gradation conversion (B) as concrete examples of the LUT for gradation conversion according to the present embodiment. In FIG. 3, a horizontal axis represents the brightness of the input image data, and a vertical axis represents the brightness of the output image data. In this case, the first LUT for gradation conversion (A) plays a role of reducing a level difference of the brightness of the highlight side (a bright side with larger brightness) and increasing a level difference of the brightness of a shadow side (a dark side with smaller brightness) in the gradation conversion processing. On the other hand, in the gradation conversion processing, the second LUT for gradation conversion (B) plays a role of increasing the level difference of the brightness of the highlight side and reducing the level difference of the brightness of the shadow side.

In general, since the ground color of the sheet which is the reading object is often white, a white member is also often used on the back side thereof. On the other hand, in the reading of the image, a color tone of the read image data is biased to a specific color in some cases. The phenomenon is generally called color casting. If the ground color of the sheet and the color of the background member are white, the color tone of the image data tends to be biased towards the highlight side. For this reason, generally, by the gradation conversion processing using the first LUT for gradation conversion (A), the level difference of the brightness of the highlight side of the image data is reduced (generally, expressed as "eliminate the highlight side").

FIG. 4 is a diagram illustrating a concrete example of the image data obtained by eliminating the highlight side by the gradation conversion processing. As shown in FIG. 4, in the image data obtained by eliminating the highlight side, the level difference between the white color of the sheet ground and the white color of the member of the sheet back surface becomes small, making it difficult to distinguish a boundary therebetween. Therefore, it is difficult to accurately extract the image of the sheet part from the image data.

Contrarily, the back surface image processing section 34 executes the gradation conversion processing using the second LUT for gradation conversion (B) on the back surface image data to increase the level difference of the brightness of the highlight side. By executing such a gradation conversion processing, the level difference between the white color of the sheet ground and the white color of the member of the sheet back surface in the read back surface image is enlarged, and the boundary therebetween becomes clearer. After executing such a gradation conversion processing, the back surface image processing section 34 specifies the sheet position in the image by identifying the boundary between the sheet ground and the member of the sheet back surface and stores the back surface position information indicating the specified sheet position in the storage section 36.

The front surface image processing section 35 extracts the image data of the sheet front surface from the front surface image data based on the back surface position information generated by the back surface image processing section 34. The front surface image processing section 35 outputs the extracted image data of the sheet front surface as the reading result. The front surface image processing section 35 may execute the gradation conversion processing using the first LUT for gradation conversion (A) to the front surface image data before extracting or to the extracted image data of the sheet front surface.

Figure 5:
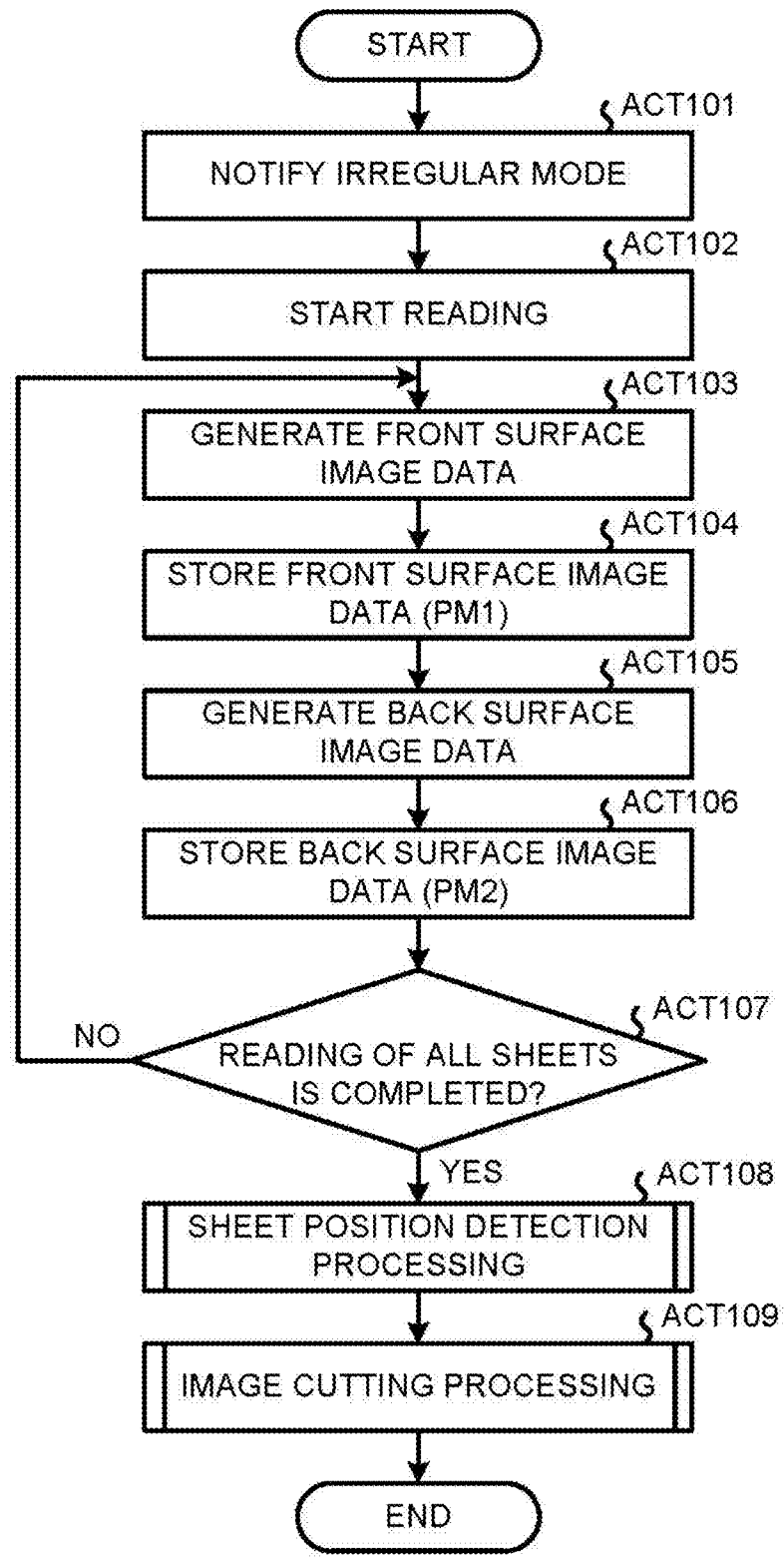
FIG. 5 is a flowchart illustrating the flow of a processing of reading an irregular sheet by the image processing apparatus 100 according to the present embodiment.

FIG. 5 is a flowchart illustrating the flow of a processing of reading the irregular sheet by the image processing apparatus 100 according to the present embodiment. First, an instruction to execute the reading in the irregular mode is input to the image processing apparatus 100. For example, the instruction is input by operating the control panel 2 by the user. The control panel 2 informs the reading controller 33 of the image reading section 3 that the input instruction instructs to execute the reading in the irregular mode. The reading controller 33 informs the front surface reading section 31, the back surface reading section 32, the back surface image processing section 34 and the front surface image processing section 35 that the reading mode is the irregular mode (ACT 101).

The front surface reading section 31 and the back surface reading section 32 start reading a sheet in response to the notification of the reading mode (ACT 102). The front surface reading section 31 reads the front surface of the sheet to generate the front surface image data (ACT 103). The front surface reading section 31 stores the generated front surface image data in a page memory (ACT 104). Similarly, the back surface reading section 32 reads the back surface of the sheet to generate the back surface image data (ACT 105). The back surface reading section 32 stores the generated back surface image data in a page memory (ACT 106). The page memories may be separately provided for the front surface and the back surface, or an area for the front surface and an area for the back surface may be provided on a page of memory. The front surface image data and the back surface image data are stored in the page memory in association with each read sheet.

The reading controller 33 determines whether the reading of all sheets to be read is completed (ACT 107). If there is a sheet of which the reading is not completed (No in ACT 107), the reading controller 33 returns the processing in ACT 103 and enables the front surface reading section 31 and the back surface reading section 32 to read the next sheet. On the other hand, if the reading of all the sheets is completed (Yes in ACT 107), the reading controller 33 enables the back surface image processing section 34 to execute the image processing in the irregular mode. Specifically, the back surface image processing section 34 executes the sheet position detection processing to generate the back surface position information based on the back surface image data (ACT 108).

Figure 6:
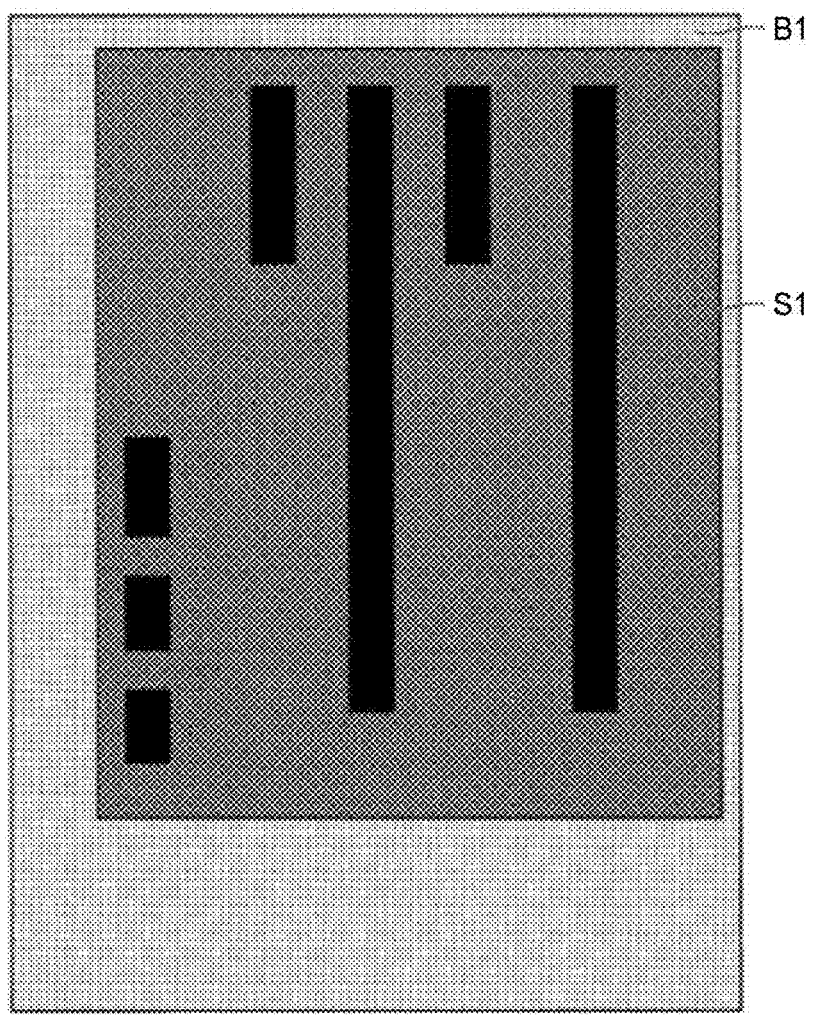
FIG. 6 is a diagram exemplifying the operation of a sheet position detection processing according to the present embodiment.
Figure 7:
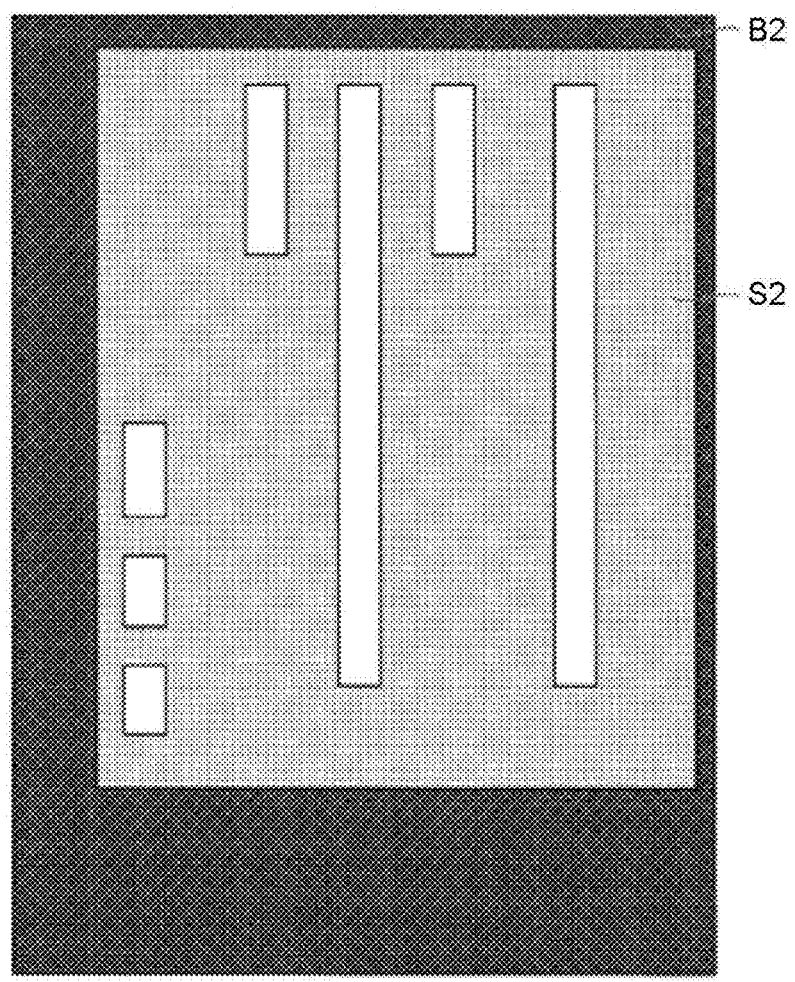
FIG. 7 is a diagram exemplifying the operation of the sheet position detection processing according to the present embodiment.

FIG. 6 and FIG. 7 are diagrams illustrating examples of the operation of the sheet position detection processing according to the present embodiment. Similar to the front surface image data, the back surface image data includes an image of a ground part S1 of the sheet and an image of the member part B1 of the sheet back surface. The back surface image processing section 34 executes the gradation conversion processing using the second LUT for gradation conversion (B) on the back surface image data as a first stage of the sheet position detection processing. FIG. 6 shows a concrete example of the back surface image data subjected to the gradation conversion processing. As shown in FIG. 6, by executing the gradation conversion processing using the second LUT for gradation conversion (B) on the back surface image data, the level difference between the white color of the sheet ground part 51 and the white color of the member part B1 of the sheet back surface is enlarged. By identifying the boundary between the sheet ground and the member of the sheet back surface that are clarified by enlarging the level difference, the back surface image processing section 34 specifies the sheet position in the back surface image and stores the back surface position information indicating the specified sheet position in the storage section 36.

The back surface image processing section 34 may execute an inversion processing of the brightness on the back surface image data before executing the second gradation conversion processing in advance. FIG. 7 shows a concrete example of the back surface image data on which the inversion processing of the brightness is executed. As shown in FIG. 7, the brightness is inverted beforehand so that the boundary between a sheet ground part S2 and a member part B2 of the sheet back surface becomes clearer in the back surface image data subjected to the second gradation conversion processing, and it becomes possible to more accurately specify the sheet position in the back surface image.

Returning to the description of FIG. 5. The front surface image processing section 35 then executes an image extracting processing for extracting the image of the sheet part from the front surface image data based on the back surface position information generated by the back surface image processing section 34 (ACT 109). The front surface image processing section 35 outputs the image data of the sheet front surface extracted by the image extracting processing as the reading result of the irregular mode.

Figure 8:
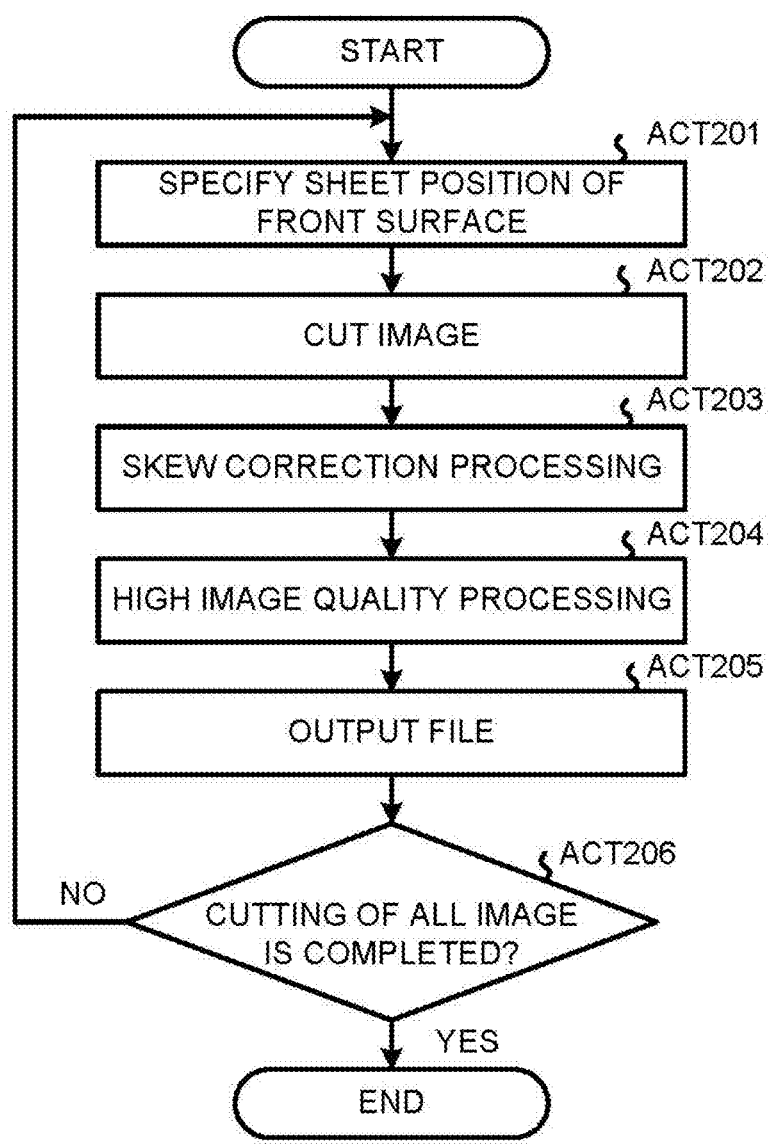
FIG. 8 is a flowchart illustrating the flow of an image extracting processing according to the present embodiment.

FIG. 8 is a flowchart illustrating the flow of the image extracting processing according to the present embodiment. First, the front surface image processing section 35 acquires the back surface position information generated by the back surface image processing section 34 from the storage section 36. The front surface image processing section 35 specifies the sheet position in the front surface image data based on the acquired back surface position information (ACT 201). Since the back surface position information generated by the back surface image processing section 34 indicates the sheet position in the back surface image data, the sheet position in the front surface image data can be specified by inverting the sheet position indicated by the back surface position information in a main scanning direction.

Figure 9:
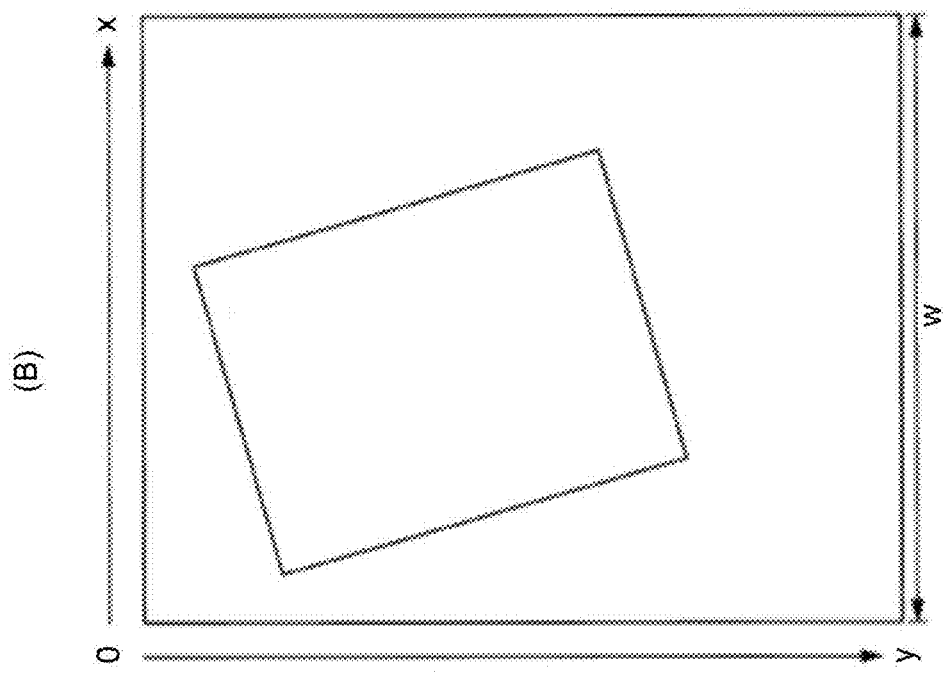
FIG. 9 is a diagram illustrating a concrete example of a relationship between a sheet position in front surface image data and a sheet position in back surface image data.
Figure 9:
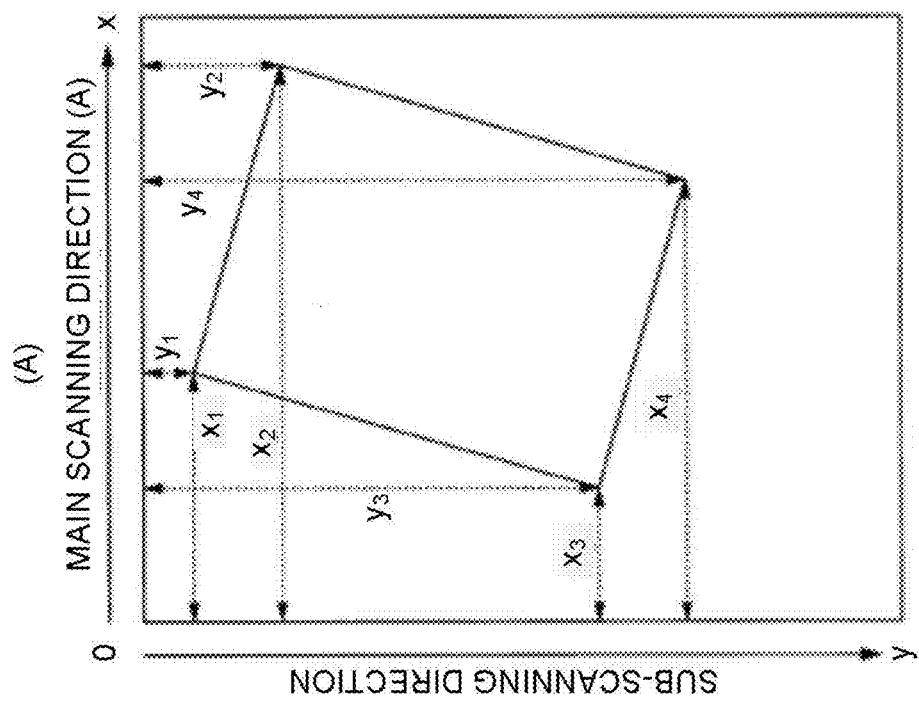

FIG. 9 is a diagram illustrating a concrete example of the relationship between the sheet position in the front surface image data and the sheet position in the back surface image data. FIG. 9(A) shows a concrete example of the back surface image data, and FIG. 9(B) shows a concrete example of the front surface image data on the same sheet as that in FIG. 9(A). The numbers attached to the vertical and horizontal axes in FIG. 9(A) and FIG. 9(B) correspond to coordinates of each pixel. An x-axis direction corresponds to the main scanning direction, and a y-axis direction corresponds to a sub-scanning direction. In this case, for example, the back surface position information shows the coordinates of four corners of the sheet in FIG. 9(A). Specifically, the back surface position information shows coordinates (x1, y1) of an upper left corner of the sheet, coordinates (x2, y2) of an upper right corner of the sheet, coordinates (x3, y3) of a lower left corner of the sheet, and coordinates (x4, y4) of a lower right corner of the sheet. In this case, in the back surface image having a position relationship that the back surface image and the front surface image are inverted, the coordinates of the upper left corner of the sheet can be specified as (W-x2, y2), the coordinates of the upper right corner of the sheet can be specified as (W-x1, y1), the coordinates of the lower left corner of the sheet can be specified as (W-x4, y4), and the coordinates of the lower right corner of the sheet can be specified as (W-x3, y3). Herein, W represents the number of pixels (width) in the main scanning direction in the image data.

Returning to the explanation of FIG. 8. Then based on the position information (hereinafter, referred to as "front surface position information") of the sheet front surface specified as in the example in FIG. 9, the front surface image processing section 35 generates front surface sheet image data obtained by extracting the image of the sheet front surface from the front surface image data held in the page memory PM1 (ACT 202). The skew correction section 37 executes a skew correction processing for correcting the deviation of inclination (generally referred to as "skew") on the acquired front surface sheet image data (ACT 203). Skew correction may detect the deviation of the inclination from the coordinates of the four corners of the sheet, or detect the deviation of inclination based on content (for example, characters) of the image identified by image analysis.

Subsequently, the high image quality processing section 38 executes a high image quality processing (noise reduction, edge enhancement, etc.) on the front surface sheet image data after the skew correction (ACT 204). The high image quality processing section 38 outputs the front surface sheet image data subjected to the high image quality processing in a predetermined file format (ACT 205). The file may be stored in a storage medium such as the storage section 36 or may be sent to an external device.

The front surface image processing section 35 determines whether or not the image extracting processing is executed on all the front surface image data which is a processing object (ACT 206). If there is unprocessed front surface image data (No in ACT 206), the front surface image processing section 35 returns to the processing in ACT 201 and executes the image extracting processing on the unprocessed front surface image data. On the other hand, if the image extracting processing is executed for all the front surface image data (Yes in ACT 206), the front surface image processing section 35 ends the image extracting processing.

FIG. 10 is a diagram illustrating a concrete example of the image data outputted as the reading result. The image processing apparatus 100 of the embodiment constituted in this way reads the sheet back surface if the irregular sheet is read. Then, by executing the gradation conversion processing using the setting information (the LUT for gradation conversion) which is different from normal setting on the read back surface image data, it is possible to enlarge the level difference between the ground color of the sheet and the color of the member of the sheet back surface and to more precisely specify the sheet position. Therefore, according to the image processing apparatus 100 of the embodiment, it is possible to realize reading of the irregular sheet with a simpler constitution.

In the above embodiment, the multi-function peripheral is exemplified as an example of the image processing apparatus; however, the image processing apparatus of the embodiment may be constituted as a device having only an image reading function.

Further, the range of reading in the irregular mode may be any range as long as the sheet which is the reading object is included therein. For example, if a sheet such as a business card or a receipt is assumed, the range of reading may be set to a specific range such as A4, B5 and the like which includes those sheets. If a size of the irregular sheet is large, the range of reading may be set to a maximum range such as A3. If the image processing apparatus is capable of detecting the size of the sheet as a preprocessing of reading, the image processing apparatus may change the range of reading according to the size of the detected sheet.

In reading in the irregular mode, if both of the front and back surfaces of the sheet are reading objects, in addition to the sheet position detection processing, the back surface image processing section 34 may execute a processing similar to the front surface image data on the back surface image data. By executing such processing, the back surface image processing section 34 can deal with duplex reading of the irregular sheet. In this case, the image processing apparatus may have two page memories composed of a page memory for holding the back surface image data for the sheet position detection processing and a page memory for holding the back surface image data for the image extracting processing. The image processing apparatus dealing with the duplex reading of such an irregular sheet may be realized by enabling the back surface image processing section 34 to execute the image extracting processing on the back surface image data, or may be realized by adding a functional section similar to the front surface image processing section 35 as a second back surface image processing section.

The image processing apparatus of an embodiment may read the irregular sheet in conjunction with an external system. For example, the image processing apparatus may send to an expense settlement system requiring image data of a receipt or the like, or a cloud system that provides similar function. The image processing apparatus may read the irregular sheet according to a request of these external systems.

According to at least one embodiment described above, by including the back surface image processing section which detects the position of the sheet part in the back surface image based on the back surface image obtained by reading the sheet back surface, and the front surface image processing section which extracts the image of the sheet part from the front surface image obtained by reading the sheet front surface based on the position of the sheet part in the back surface image, it is possible to realize reading of the irregular sheet with a simpler constitution. According to the present embodiment, as the image processing on the image data of the sheet front surface and the image processing on the image data of the sheet back surface are executed in parallel, at the time of simultaneous reading of both sides of the sheet, waiting time for specifying the size of the sheet does not occur and it is possible to extract the image.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. An image processing apparatus, comprising:
    a scanner configured to read a front surface of a sheet and a back surface of the sheet;
    a cover configured to overlap the sheet while the scanner reads the sheet; and
    a processor and storage configured to:
    store a function for gradation conversion to convert image data obtained from the scanning of the back surface of the sheet; and
    perform a back surface processing by applying the function to the image data of the back surface so that the brightness difference between a first pixel and a second pixel becomes enlarged to distinguish the image data of the back surface from the image data of the cover;
    perform a front surface processing by extracting image data of the front surface based on the image data of the back surface obtained by the back surface processing; and
    output image data as a reading result based on the back surface and front surface processing.

2. The image processing apparatus according to claim 1, wherein
    the scanner is configured to acquire the front surface image data and the back surface image data of the sheet in one reading operation, and
    the front surface processing on the front surface image data and the back surface processing on the back surface image data are executed in parallel.

3. The image processing apparatus according to claim 1, wherein
    the processor is configured to execute the function for gradation conversion processing if a reading mode is an irregular mode used for reading an irregular sheet.

4. The image processing apparatus according to claim 1, wherein the processor is configured to execute skew correction processing on the extracted image to provide a skew corrected image.

5. The image processing apparatus according to claim 4, wherein the processor is configured to execute image quality processing on the skew corrected image.

6. The image processing apparatus according to claim 1, wherein the processor is configured to detect the position of a sheet part in the back surface image data by identifying a boundary between a background part of the sheet and the sheet part.

7. An image processing method, including:
    reading a front surface of a sheet and a back surface of the sheet;
    overlapping the sheet via a cover while the scanner reads the sheet;
    storing a function for gradation conversion processing to convert image data obtained from the scanning of the back surface of the sheet;
    performing a back surface processing by applying the function to the image data of the back surface so that the brightness difference between a first pixel and a second pixel becomes enlarged to distinguish the image data of the back surface from the image data of the cover;
    performing a front surface processing by extracting image data of the front surface based on the image data of the back surface obtained by the back surface processing; and
    outputting image data as a reading result based on the back surface and front surface processing.

8. The method according claim 7, further comprising
    acquiring the front surface image data and the back surface image data of the sheet in one reading operation, and
    wherein image processing on the front surface image data and image processing on the back surface image data are executed in parallel.

9. The method according to claim 7, further comprising:
    executing gradation conversion processing if a reading mode is an irregular mode used for reading an irregular sheet.

10. The method according to claim 7, further comprising detecting the position of a sheet part in the back surface image data comprising identifying a boundary between a background part of the sheet and the sheet part.

* * * * *